United States Patent Office 3,567,287
Patented Mar. 2, 1971

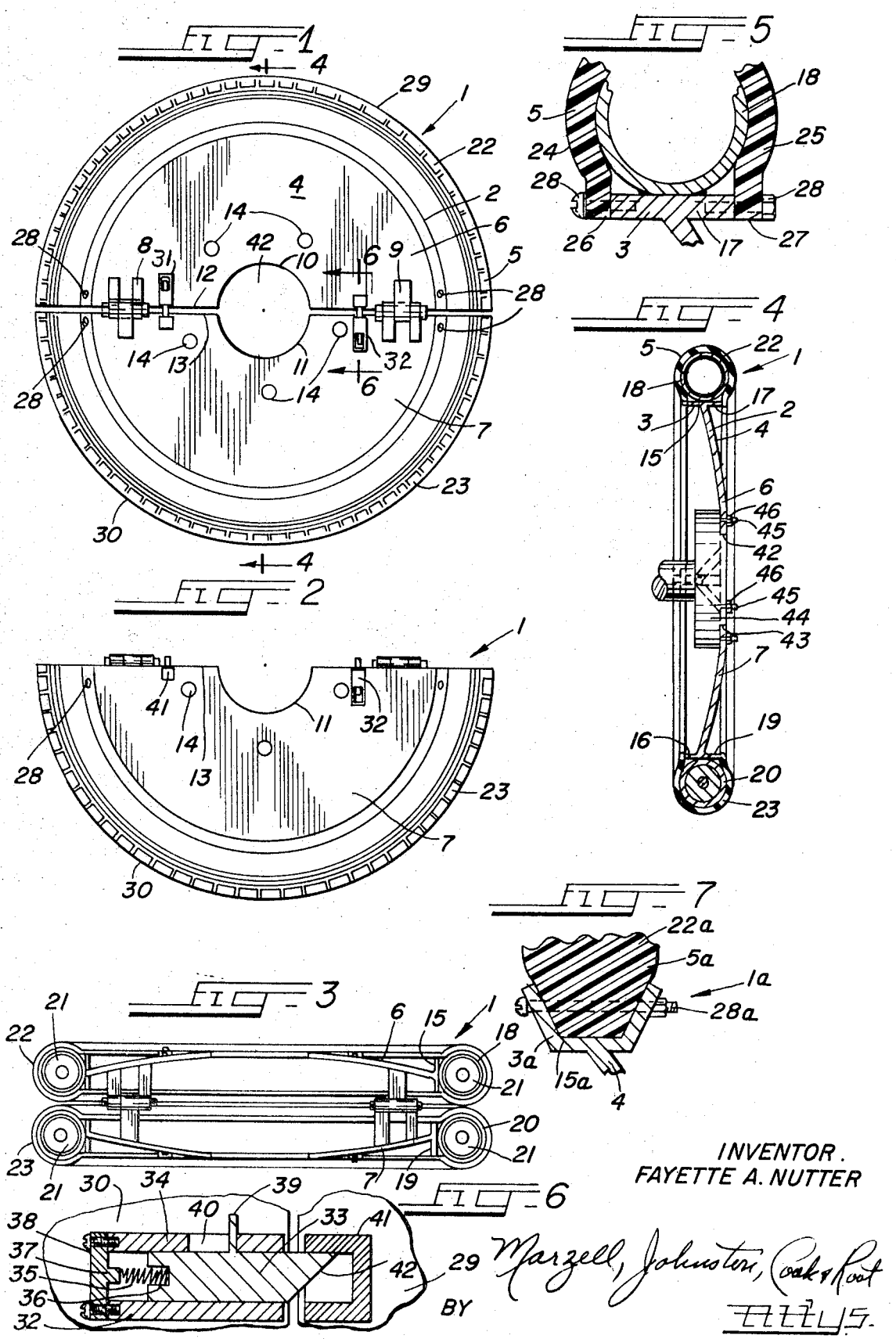
March 2, 1971     F. A. NUTTER     3,567,287
WHEEL AND TIRE ASSEMBLIES
Filed Oct. 9, 1968
INVENTOR.
FAYETTE A. NUTTER

3,567,287
WHEEL AND TIRE ASSEMBLIES
Fayette A. Nutter, 704 E. 5th St., Canton, S. Dak. 57013
Filed Oct. 9, 1968, Ser. No. 766,119
Int. Cl. B60b *19/00*
U.S. Cl. 301—38      2 Claims

ABSTRACT OF THE DISCLOSURE

A foldable wheel and tire assembly for vehicles.

BACKGROUND OF THE INVENTION

This invention relates to wheel and tire assemblies and, more particularly, to wheel and tire assemblies which are particularly well adapted for use in providing a spare tire for motor vehicles such as automobiles, and the like.

It is a primary object of the present invention to afford a novel wheel and tire assembly for vehicles.

It is well known that extra wheel and tire assemblies, commonly known as "spares," are commonly carried on vehicles such as automobiles, trucks, buses and the like, so that, in the event of a flat tire at a location where there are no facilities for repairing the same, the wheel and tire can be "changed." Heretofore, it has been common practice to afford spare wheel and tire assemblies, which were of the same size and construction as the regular wheel and tire assemblies used on the vehicle.

Wheel and tire assemblies used as part of the regular running gear of automobiles, trucks, buses, and the like, are normally relatively large and cumbersome in size. As a result, the carrying of such assemblies as spares creates a substantialy problem in the provision of storage or carrying space. In addition, such wheel and tire assemblies are commonly relatively heavy and, therefore, difficult to handle, especially when mounting the assembly on the axle of a vehicle.

It is an important object of the present invention to overcome the disadvantages of spare wheel and tire assemblies herefore known in the art.

Another object of the present invention is to afford a novel spare wheel and tire assembly which is relatively light in weight and easy to handle.

Another object is to afford a novel spare wheel and tire assembly which is quickly and easily foldable between one position for use as a part of the running gear of a vehicle and another position for storage.

An object ancillary to the foregoing is to afford a novel spare wheel and tire assembly which is relatively small and compact in size when the parts thereof are disposed in storage position.

Another object is to afford a novel spare wheel and tire assembly which may be readily stored in a relatively small space when being carried as a "spare."

A further object is to afford a novel spare wheel and tire assembly which may be readily mounted on an removed from a vehicle.

Another object is to afford a novel spare wheel and tire assembly of the aforementioned type, wherein the tire thereof may be readily changed, if necessitated by wear, or the like.

A further object is to afford anovel spare wheel and tire assembly which is practical and efficient in operation, and which may be readily and economically produced commerically.

Other and further objects of the present invention will be apparent from the following description and claims and are illustrated in the accompanying drawings which, by way of illustration, show the preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

DESCRIPTION OF THE DRAWINGS

In the drawings:

FIG. 1 is a side elevational view of a wheel and tire assembly embodying the principles of the present invention, with the assembly shown in such position that it is ready for mounting on the axle of a vehicle;

FIG. 2 is a side elevational view of the wheel and tire assembly embodying the principles of the present invention, with the assembly shown in such position that it is ready for mounting on the axle of a vehicle;

FIG. 3 is a top plan view of FIG. 2;

FIG. 4 is a sectional view taken substantially along the line 4—4 in FIG. 1, with the wheel and tire assembly mounted in operative position on the hub of a vehicle;

FIG. 5 is a fragmentary, enlarged detail sectional view of a portion of the wheel and tire assembly shown in FIG. 4;

FIG. 6 is a fragmentary detail sectional view taken substantially along the line 7—7 in FIG. 1; and FIG. 7 is a fragmentary, detail sectional view similar to FIG. 5, but showing a modified form of the present invention.

DESCRIPTION OF THE EMBODIMENTS SHOWN HEREIN

A wheel and tire assembly 1, embodying the principles of the present invention, is shown in FIGS. 1–6 of the drawings to illustrate the presently preferred embodiment of the present invention.

The wheel and tire assembly 1 embodies, in general, a wheel 2 having a rim 3 disposed around the outer periphery of a body portion 4, with a tire 5 removably mounted on the rim 3.

The body portion 4 and the rim 3 of the wheel 2 may be made of any suitable material such as, for example, steel. The body portion 4 embodies two substantially semicircular shaped sections 6 and 7 hingedly connected to each other along a diameter of the wheel 2 by two hinges 8 and 9 disposed on opposite sides of the axial center of the wheel 2, FIG. 1. The sections 6 and 7 of the body portion 4 are convex to the right in transverse cross section, as viewed in FIG. 4, and each section 6 and 7 has a substantially semicircular shaped recess 10 and 11 formed therein along the longitudinal center portion of the cord 12 and 13 thereof, respectively, FIG. 1. A plurality of spaced openings 14 extend through the sections 6 and 7 of the body portion 4 radially outwardly of the recesses 10 and 11.

The rim 3 embodies two arcuate shaped sections 15 and 16 mounted on the outer peripheries of the arcuate portions of the sections 6 and 7 of the body portion 4, respectively. The section 15 of the rim 3 embodies an inner portion 17 which is substantially rectangular in transverse cross section, and a tubular outer portion 18, which is substantially circular in transverse cross section, FIGS. 4 and 5. The outer portion 18 of the section 15 is secured to the inner portion 17 thereof by suitable means such as welding. Similarly, the section 16 of the rim 3 embodies a substantially rectangular shaped inner portion 19 on which is secured a substantially circular shaped tubular outer portion 20, FIG. 4.

Plugs 21 are preferably mounted in each of the end portions of each of the outer portions 18 and 20 of the rim 3 so as to prevent dirt, or other debris, from entering the outer portions 18 and 20 of the rim 3. The plugs 21 may be made of any suitable material such as, for example, rubber, wood or steel, and they are firmly secured in the sections 18 and 20 of the rim 3 against accidental dislodgment therefrom by suitable means such as, for example, mounting them in the respective sections 18 and 20 with a force fit.

The tire 5 shown in FIGS. 1–5 of the drawings is hollow in transverse cross section, and embodies two arcuate shaped sections 22 and 23 removably mounted on the sections 15 and 16 of the rim 3, respectively. The tire 5 is of the commonly known type which is open at its inner periphery to afford two oppositely disposed side wall portions 24 and 25 terminating in free edge portions 26 and 27, respectively.

In the assembled wheel and tire assembly 1, the sections 22 and 23 of the tire 5 are removably mounted on the sections 15 and 16 of the rim 3, respectively, with the inner faces thereof preferably disposed in snug fitting juxtaposition to the outer faces of the outer portions 18 and 20 of the rim 3, and with the free edges 26 and 27 of the tire sections 22 and 23 disposed on opposite sides of the respective inner portions 17 and 19 of the rim 3 in snug fitting engagement with the adjacent outer edges thereof. The tire 5 may be removably secured to the rim 3 by suitable means such as, for example, bolts 28 extending through the free edge portions 26 and 27 of the tire sections 22 and 23 into the inner portions 17 and 19 of the rim sections 15 and 16, respectively.

From the foregoing it will be seen that the wheel and tire assembly 1 embodies two sections 29 and 30 hingedly connected to each other by the hinges 8 and 9, the section 29 including the wheel section 6, the rim section 15 and the tire section 22, and the section 30 including the wheel section 7, the rim section 16 and the tire section 23. With this construction, the wheel and tire sections 29 and 30 are pivotable relative to each other on the hinges 8 and 9 between the erected position shown in FIGS. 1 and 4, wherein the rim sections 15 and 16 and the tire sections 22 and 23 are disposed in uniplanar relation to each other, and the collapsed or folded position shown in FIGS. 2 and 3, wherein the rim section 15 and the tire section 22 are disposed in parallel relation to the rim section 16 and the tire section 23, respectively, with the tire sections 22 and 23 disposed in juxtaposed side-by-side relation to each other.

Two spring latches 31 and 32 are mounted on the wheel and tire sections 29 and 30, between the hinges 8 and 9 and the recesses 10 and 11, respectively, FIG. 1. The two latches 31 and 32 are identical in construction and operation, and each embodies an elongated plunger 33 slidably mounted in a housing 34 for longitudinal reciprocation between a fully extended position and a fully retracted position shown in solid and broken lines, respectively, in FIG. 6, with respect to the latch 32. A compression coil spring 35 is mounted in a recess 36 in the rear end portion of each of the plungers 33, and is disposed on a boss 37 projecting inwardly from the rear wall 38 of the respective housing 34. Each spring 35 is effective to urge the respective plunger 33 toward its aforementioned fully extended position. A finger 39 on each plunger 33 projects outwardly through a slot 40 formed in the adjacent top of the housing 34 and affords a handle by which the plunger 33 may be manually retracted from fully extended position to retracted position. The finger 39 also affords a stop member which is engageable with the front end wall of the slot 40 to limit the forward movement of the plunger 33 to the aforementioned fully extended position.

Each of the latches 31 and 32 also embodies a respective catch 41 in the form of an open ended housing mounted on the sections 30 and 29, respectively, of the wheel and tire assembly. The catches 41 are disposed in axial alignment with the respective housings 34 of the latches 31 and 32 with the open ends thereof facing toward the front ends of the respective adjacent plungers 33, FIG. 7. The catches 41 are so disposed on the wheel and tire assembly 1, that when the latter is disposed in the erected position shown in FIG. 1, the plungers 33 of the respective latches 31 and 32 are operatively engaged with the catches 41 when the plungers are disposed in fully extended position, to thereby hold the sections 29 and 30 in the erected position. When it is desired to move the sections 29 and 30 from erected position to the aforementioned collapsed or folded position shown in FIGS. 2 and 3, the plunger 33 may be manually retracted by actuation of the fingers 39 to thereby free them from the respective catches 41 and free the sections 29 and 30 of the wheel and tire assembly 1 for movement on the hinges 8 and 9 into the collapsed position. Preferably, the front ends of the plungers 33 are beveled, as shown at 42 in FIG. 7, so that when the wheel and tire assembly sections 29 and 30 are moved from collapsed position to the aforementioned erected position, the front ends of the plungers 33 may ride downwardly over the adjacent end edges of the catches 41 to thereby automatically retract the plungers 33 into the respective housings 34 until the plungers 33 are disposed in axial alignment with the respective catches 41. When such axial alignment occurs, the springs 35 are effective to move the plungers 33 outwardly into fully extended position to thereby releasably engage the catches 41 in position to hold the wheel and tire assembly sections 29 and 30 in the aforementioned erected position.

With this construction, the latches are disposed in substantially diametrically opposite relation to each other on the wheel and tire assembly 1, and are disposed in opposite positions relative to the dividing line between the wheel and tire sections 29 and 30 so as to afford proper balance to the erected wheel and tire assembly 1.

When the wheel and tire assembly 1 is disposed in the aforementioned erected position, the recesses 10 and 11 in the wheel 2 combine to form a circular shaped opening 42 which is of such size as to snugly receive the circumferential shoulder 43 of a hub 44 of a vehicle on which the wheel and tire assembly 1 is to be used as part of the running gear, as illustrated in FIG. 4. The hub 44 shown in FIG. 4 embodies a plurality of outwardly projecting bolts 45 spaced around the shoulder 43, and the openings 14 in the wheel and tire assembly 1 are correspondingly spaced so that when the wheel and tire assembly 1 is disposed in operative position on the hub 44, the bolts 45 are received in respective ones of the openings 14. Nuts 46 may be mounted on the bolts 45 to secure the wheel and tire assembly 1 to the hub 44.

As will be appreciated by those skilled in the art, in some instances the hubs of vehicles on which wheels are to be mounted, rather than having outwardly projecting bolts, such as the bolts 45, have threaded openings therein, and the wheels are secured to such hubs by bolts extended through the wheels and threaded into the openings. Although the hub 44 is shown herein as embodying bolts 45, it will be appreciated by those skilled in the art that this is merely by way of illustration and not by way of limitation, and that, if desired, the wheel and tire assembly 1 may be secured to the hub of a vehicle by means of bolts inserted through the openings 14 and threaded into corresponding openings in the hub, without departing from the purview of the broader aspects of the present invention.

In its folded or collapsed position, as shown in FIGS. 2 and 3, the wheel and tire assembly 1 is relatively small and compact in size. Such collapsed position is preferred when the wheel and tire assembly 1 is to be stored. It will be seen that when the wheel and tire assembly 1 is disposed in the aforementioned collapsed position, it may be stored in a relatively small space.

In addition, preferably, the width of the wheel and tire assembly 1 is a minor fraction of the width of the regular wheel and tire assembly for which it is intended to be a replacement, although, of course, the diameters thereof should be the same, and it is essential that the wheel and tire assembly be of sufficient width to afford the strength necessary for supporting the vehicle during the limited use of the assembly for which it is intended. For example, if the regular wheel and tire assembly is thirty inches in diameter and seven inches wide, the wheel and tire assembly 1 intended as a replacement therefor should have a diameter of thirty inches, but, preferably, has a width in the nature of two or three inches. Such construction, it will be seen, will result in an additional saving in storage space for the wheel and tire assembly.

In FIG. 7 a modified form of the present invention is shown wherein the tire is solid rather than hollow. The wheel and tire assembly 1a, which is illustrated in FIG. 7, is identical in construction to the wheel and tire assembly 1 shown in FIGS. 1–6, except that both of the sections of the rim 3a are substantially U-shaped in transverse cross section, as illustrated at 15a; both of the sections of the tire 5a are solid in construction, as illustrated at 22a; and the tire 5a is releasably connected to the rim 3a by bolts 28a which extend completely through the respective tire sections and the side walls of the sections of the rim 3a. The tire 5a may be constructed of any suitable material, but, preferably, is constructed of a resilient material such as, for example, hard rubber.

From the foregoing it will be seen that the present invention affords a novel wheel and tire assembly which provides a perfectly practical "spare" for use in an emergency as a replacement for the regular wheel and tire assembly. Although it is not intended to afford a wheel and tire assembly for use in transporting a vehicle over long distances or at the normal maximum speeds of travel thereof, the present invention does afford a wheel and tire assembly which provides a perfectly practical "spare" for use at reduced speeds and over the relatively short distances normally necessary to travel in order to reach a garage or service station for the purpose of repairing a flat tire.

Also, it will be seen that the present invention affords a novel wheel and tire assembly which, in stored condition, occupies relatively little space.

In addition, it will be seen that the present invention affords a novel tire and wheel assembly which can be relatively light in weight, and which may be quickly and easily mounted on and removed from the hub of a vehicle, such as, for example, an automobile.

Also, it will be seen that the present invention affords a novel wheel and tire assembly which is practical, and which may be readily and economically produced commercially.

Thus, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A wheel and tire assembly for a vehicle having a hub for securing a wheel and tire assembly thereto, said assembly comprising:

(a) a wheel comprising two substantially semicircularly shaped sections hingedly connected together for movement between side-by-side relation to each other and substantially diametrically opposite projecting relation to each other, and (b) a tire comprising two substantially semicircularly shaped sections mounted on the outer peripheries of respective ones of said wheel sections in radially outwardly projecting relation thereto, each of said tire sections having a hollow tubular reinforcing member mounted therein, (c) said tire having a width on the order of one-tenth to one-fifteenth of the diameter of said wheel and tire assembly, (d) said tire sections being movable with said respective wheel sections during said movement of said wheel sections between said side-by-side and diametrically opposite projecting relations, (e) said wheel sections comprising arcuate-shaped rim sections disposed around respective body portions, (f) said body portions having openings therethrough for the reception of fastening means therein for securing said wheel and tire to such a hub when said wheel sections are disposed in said diametrically opposite projecting relation to each other, (g) said rim sections being disposed in substantially uniplanar relation to each other when said wheel sections are disposed in said diametrically opposite projecting relation to each other, and (h) said body portions being convex outwardly in substantially one direction only transversely to the plane of said rim sections when said wheel sections are disposed in said diametrically opposite projecting relation to each other, and having a transverse thickness less than the corresponding width of said tire sections.

2. A wheel and tire assembly as defined in claim 1, and which includes:

(a) two catches mounted on said body portions in substantially diametrically opposed relation to each other, and (b) two manually operable latches mounted on the respective other ones of said body portions in position to operatively engage respective ones of said catches for releasably holding said wheel sections in said diametrically opposite projecting relation.

References Cited

UNITED STATES PATENTS

| | | | |
|---|---|---|---|
| 835,939 | 11/1906 | Cooper | 152—385 |
| 1,043,642 | 11/1912 | Stoneham | 152—380X |
| 1,443,080 | 1/1923 | Lubeck | 152—156X |
| 2,251,310 | 8/1941 | Williams | 152—414X |
| 2,584,073 | 1/1952 | Williams | 152—379X |
| 1,854,636 | 4/1932 | Westbrook | 301—38 |
| 2,533,869 | 12/1950 | Barfus | 301—38 |

FOREIGN PATENTS

| | | | |
|---|---|---|---|
| 794,345 | 4/1958 | Great Britain | 301—38 |
| 2,462,059 | 9/1960 | Australia | 301—38 |

RICHARD J. JOHNSON, Primary Examiner

U.S. Cl. X.R.

152—311, 385

PO-1050
(5/69)

UNITED STATES PATENT OFFICE
CERTIFICATE OF CORRECTION

Patent No. 3,567,287           Dated   March 2, 1971

Inventor(s) FAYETTE A. NUTTER

It is certified that error appears in the above-identified patent and that said Letters Patent are hereby corrected as shown below:

Column 2, line 16, "embodying the principles of the present invention, with the assemb shown in such position that it is ready for mounting on the axle of vehicle" should be -- shown in Fig with the assembly shown in the fol position in which it is preferably disposed for storage; --

Reference "2,462,059" should be -- 246,205 --.

Signed and sealed this 6th day of July 1971.

(SEAL)
Attest:

EDWARD M. FLETCHER, JR.          WILLIAM E. SCHUYLER, JR
Attesting Officer                Commissioner of Patents